(12) United States Patent
Doron

(10) Patent No.: US 6,563,543 B1
(45) Date of Patent: May 13, 2003

(54) DIGITAL CAMERA AND METHOD OF USING SAME

(75) Inventor: Amir Doron, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/053,819

(22) Filed: Mar. 31, 1998

(51) Int. Cl.$^7$ .............................................. H04N 5/235
(52) U.S. Cl. ...................................... 348/362; 348/345
(58) Field of Search ................................ 348/362, 363, 348/364, 365, 366, 351, 357, 361, 345, 346, 348, 349, 229, 224, 213, 143, 207, 229.1, 224.1, 207.99; 396/63, 64, 65, 67, 72, 88, 89, 429, 431, 543

(56) References Cited

U.S. PATENT DOCUMENTS

| | | | |
|---|---|---|---|
| 4,470,680 A | | 9/1984 | Inagaki |
| 4,907,024 A | * | 3/1990 | Takahashi .................... 348/348 |
| 4,942,413 A | | 7/1990 | Saegusa et al. |
| 5,111,288 A | * | 5/1992 | Blackshear .................. 348/143 |
| 5,335,041 A | | 8/1994 | Fox |
| 5,365,292 A | * | 11/1994 | Wakabayashi et al. ....... 396/281 |
| 5,625,415 A | * | 4/1997 | Ueno et al. .................. 348/346 |
| 5,631,699 A | * | 5/1997 | Saito .......................... 348/143 |
| 5,703,638 A | * | 12/1997 | Ohta et al. ................... 348/345 |
| 5,739,857 A | * | 4/1998 | Kaneda ....................... 348/349 |
| 5,748,998 A | * | 5/1998 | Ishiguro et al. ............... 396/88 |
| 5,751,354 A | * | 5/1998 | Suzuki et al. ................ 348/349 |
| 5,960,217 A | * | 9/1999 | Goto ........................... 396/65 |
| 5,970,261 A | * | 10/1999 | Ishiguro et al. ............... 396/85 |
| 6,151,072 A | * | 11/2000 | Tanaka ........................ 348/229 |

FOREIGN PATENT DOCUMENTS

| | | | |
|---|---|---|---|
| GB | | 2131249 A | 9/1983 |
| JP | | 04352573 | 12/1992 |
| JP | | 05282027 | 10/1993 |
| JP | | 07115580 | 2/1995 |
| JP | | 10-073754 | * 3/1998 |

* cited by examiner

*Primary Examiner*—Aung S. Moe

(57) ABSTRACT

A camera which powers up in a default fixed-focus mode and has a capability whereby the photographer can select an auto-focus mode. The camera includes a lens, a shutter and a motor for moving the lens and for opening the shutter. A CCD, electrically interconnected to an analog to digital signal converter, receives image data and transforms the data to analogs for transmission to the converter where a digital output signals is generated. The digital signal is electrically transmitted to a processor which is electrically connected to the motor. In the camera default fixed focus mode, a first control algorithm facilitates a process wherein the processor generates an electrical signal to cause the motor to move the lens directly to a control position. To elect the auto-focus mode of camera operation, the photographer depresses a button and thereby selects a process which functions in accordance with the steps of a second control algorithm wherein the processor generates an electrical signal to cause the motor to move the lens past a focal point, and a second signal to cause the lens to backstep to the focal point. When the auto mode is selected, an icon appears on a data liquid crystal display (LCD) to indicate that auto focus mode is selected.

4 Claims, 4 Drawing Sheets

APERTURE CHOICES

DIGITAL CAMERA AND METHOD OF USING SAME

FIELD OF THE INVENTION

The present invention relates generally to cameras and, more particularly, to digital cameras having fixed focus and automatic focus mode features.

BACKGROUND OF THE INVENTION

In general, hand held cameras may be one of two types: Automatic focus (auto-focus) and fixed focus. Before discussing the merits and characteristics of the two camera types, it will be worthwhile to consider the concepts of "focal point" and "depth of field" for helping to gain a more clear understanding of camera operations. Focal point is generally defined as the point on the axis of the camera lens at which incident, parallel light rays converge or appear to converge. Pictures taken at the focal point of the lens will be in sharp focus and, absent any unfavorable circumstances, a clear photograph will result.

Depth of field may be defined as the distance in space over which a camera lens focused on a given object can provide adequate definition or clarity. Thus, the depth of field is the area (relative to the lens) in front of and behind the true focal point.

In this regard, the position of the lens can be adjusted, or focused, on either side of the focal point and still a sharp, clearly focused image can be produced, provided the object is within the depth of field of the lens.

Considering now the merits of fixed focus and auto-focus cameras, it is well known to those skilled in the art that a fixed focus camera is less expensive to manufacture than the auto-focus type. In this regard, the fixed-focus camera generally is incapable of affecting lens or aperture changes and relies, instead, on a large depth of field wherein the object to be photographed is perceived to be in focus. Under many circumstances this technique permits suitable picture taking of objects which are several feet away from the lens to those objects at "infinity".

However, in cases where the photographer desires to take a picture of a subject that is close to the camera, for portraits of individuals, or detailed scientific study as examples, the camera auto-focus mode is the one of choice.

While superior in some cases, auto-focus cameras are more expensive to manufacture than fixed focus cameras and, in the case of most digital cameras, they are slower in operation than the fixed focus type.

In the operation of a conventional auto-focus camera, the photographer presses the camera's exposure button half way and holds it at this position to expose a charge coupled device (CCD). The CCD receives the incident light and converts it to a digital file of image data in the form of an analog signal. This signal is converted in turn by an analog to digital converter to a digital signal which then activates a processor controlled motor to move the lens, all the while following the steps of a control algorithm for focusing the lens. In this regard, the motor moves the lens incrementally and repetitively, until the incident light impinging the CCD produces the highest frequency data. At this point the lens is focused. Typically, the control algorithm permits an overstep of the optimum focal point and then backsteps the lens to that focal point. When this is attained, an LED (light emitting diode) display indicates to the photographer that the camera is ready to take the picture. The photographer then depresses the camera button the full distance and the picture is taken.

Performance of the above described auto-focus operation takes between 1 and 3 seconds. During this time, the photographer must wait for the camera to adjust its focal point before the picture can be taken. Since having to wait is often undesirable, it would be advantageous to have a digital camera having the auto focus-capability yet would be capable of taking pictures at a distance, without an auto-focus time delay.

DISCLOSURE OF THE INVENTION

The digital camera of the present invention includes a camera which powers up in a default fixed-focus mode and has a capability whereby the photographer can select an auto-focus mode. The camera includes an adjustable aperture, a lens/shutter arrangement and a motor for acting on the lens/shutter arrangement. A CCD, electrically interconnected to an analog to digital signal converter, receives frequency data and transforms the data to analogs for transmission to the converter where a digital output signal is generated. The digital signal is electrically transmitted to a processor which is electrically coupled to the motor. In the fixed focus default mode, a first control algorithm facilitates a process wherein the processor generates an electrical signal to cause the motor to move the lens directly to a control position. To elect the auto-focus mode of camera operation, the photographer depresses a button and thereby selects a process which functions in accordance with the steps of a second control algorithm. In this case, the processor generates an electrical signal to cause the motor to move the lens incrementally past a focal point, and a second signal to cause the lens to backstep to the focal point. When the auto mode is selected, an icon appears on a data liquid crystal display (LCD) to indicate that auto focus mode is selected.

The combination of the present invention provides in a novel manner the speed of a fixed-focus camera, for objects at a distance, with the capability of an auto-focus operating mode for objects that are close.

BRIEF DESCRIPTION OF DRAWINGS

The above mentioned features of this invention and the manner of attaining them will become apparent and the invention itself will be best understood by reference to the following description of the preferred embodiment of the invention, in conjunction with the accompanying drawings, wherein.

BEST MODE FOR CARRYING OUT THE INVENTION

Figure 1:
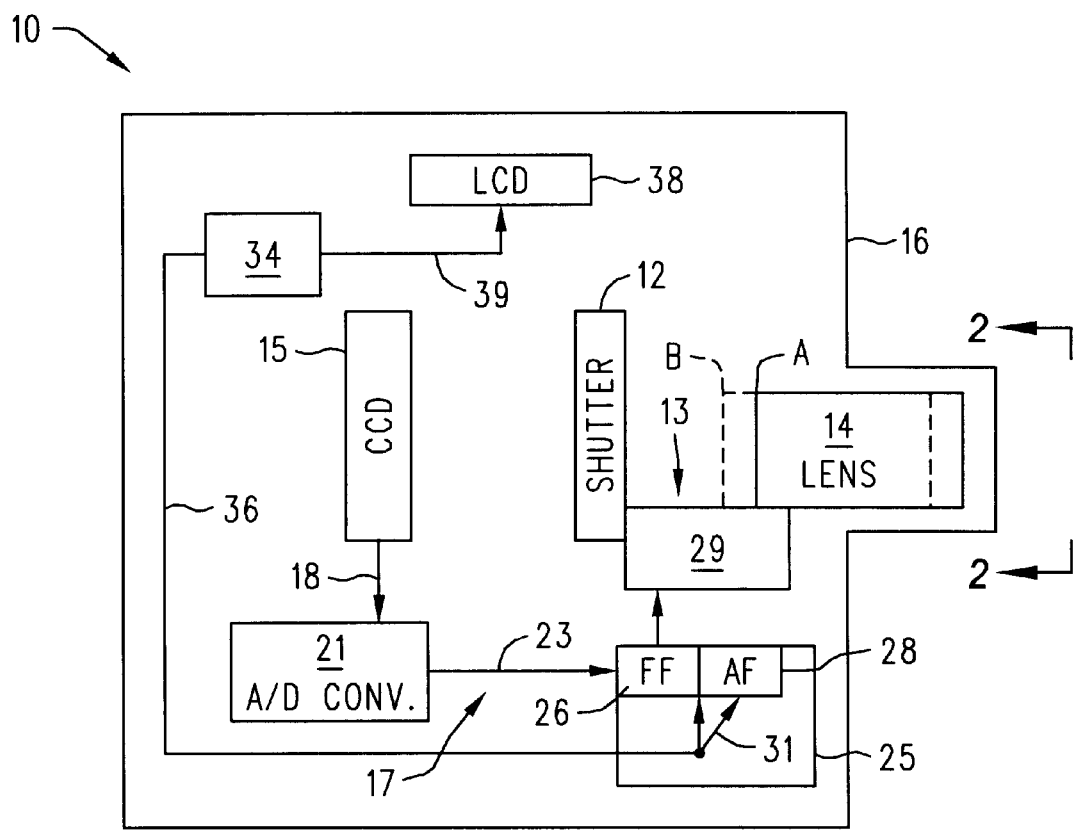
FIG. 1 is a diagrammatic representation of a digital camera which is constructed in accordance with the preferred embodiment of the present invention, the camera having a default fixed focus mode, and an automatic focus mode.
Figure 2:
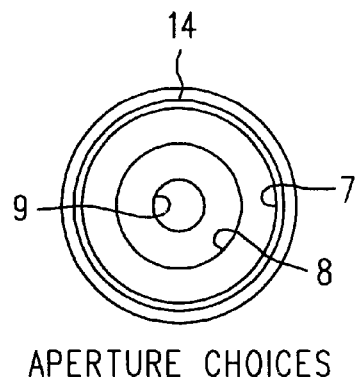
FIG. 2 is a diagrammatic representation of a view perpendicular to a plane 2—2 of FIG. 1 showing apertures for a lens of the digital camera.

Referring now to FIGS. 1 and 2, there is shown in diagrammatic representation, a digital camera 10 which is constructed according to the present invention. The camera 10 is designed for use with a personal computer system (not shown) having a display and printer to facilitate the review, formatting and printing of high quality digital photographs. In the preferred embodiment of the present invention, the camera 10 includes fixed focus and automatic focus modes of operation that are aperture sensitive, allowing the camera 10 to default to the fixed focus mode of operation. In the automatic focus mode of operation, the camera 10 automatically adjusts its focal point and aperture settings relative to the amount of light surrounding and reflecting from an object to be photographed.

In an overview, it may be stated that the camera 10 includes, within a single enclosed housing, a combination of fixed focus capability and auto-focus capability. In this regard, the camera 10 includes an adjustable aperture and lens shutter arrangement for admitting light, for a predetermined period of time, onto a charged coupled device for converting the light to an electrical signal indicative of an object to be photographed. This is accomplished by a camera setting adjustment system responsive to the electrical signal indicative of the object to be photographed which automatically adjusts the aperture to an optimal setting relative to an ambient lighting condition surrounding the object to be photographed, an automatic focus mode algorithm responsive to the optimal setting of the adjustable aperture for moving the focusable lens to a determined focal point; and a fixed focus mode algorithm for determining a focal point for the adjustable aperture relative to the ambient lighting condition surrounding the object to be photographed and for moving the lens to the determined focal point.

It will be apparent to those skilled in the art that, since the camera 10 has both fixed focus and auto-focus capability, some of the hereinafter described camera 10 elements will be common to both capabilities while other elements come into play only during the auto-focus mode of operation. Since the camera 10 powers up in the fixed focus mode, and since the identical elements described for this mode function in a generally similar manner in the auto-focus mode, the fixed focus mode of camera 10 operation will be discussed first.

The digital camera 10 includes a housing 16, a lens shutter arrangement 13 having a focusable lens 14 and a shutter 12, a camera setting adjustment system 17, and a solid state image sensing device, such as a CCD 15. The camera setting adjustment system 17 generally includes a stepper motor 29 for incrementally adjusting the focal point of the lens 14, and the size of the aperture opening, and a processor 25, coupled to the CCD 15, responding to different lighting conditions, and a processor/motor driver 25 for facilitating incremental changes in lens and aperture positions via the stepper motor 29.

In FIG. 2 there is shown a view into the lens 14 in a direction perpendicular to the plane formed by the line 2—2 of FIG. 1. Here there is shown the focusable lens 14 and three aperture sizes. These are sizes 2.8, 5.6 and 11, designated by the reference numerals 7, 8 and 9 respectively.

The camera 10 powers up in the default fixed focus mode and this mode will be first discussed. While the steps comprising this operating mode will be discussed in greater detail below, it may be summarized at this juncture that the fixed focus mode of camera 10 operation includes the steps of: a.) opening the shutter 12 to expose the CCD 15; b) determining shutter speed and aperture 14 size; c) moving the lens 14 directly to a selected position; and d) exposing the CCD 15.

In use the camera 10 powers up in a fixed focus mode of operation and the amount of light surrounding and reflecting from the object to be photographed is measured. Based on the amount of measured incident light, a combination of aperture and shutter speed is selected. In this regard, each aperture size has its own focal point. Once the aperture size is determined, the selected position is chosen from a look up table embedded in the camera 10 firmware. Thus the focal point is set at a predetermined location, based on the aperture size. In this regard, the camera 10 may be referred to as "aperture sensitive" since it has the capability of using aperture size to maximize the range within which the object can be located, and still be in focus. Thus, in the fixed focus mode, time is saved in comparison to auto-focus operation because only one lens movement is required.

The above described steps of the camera 10 fixed focus mode are performed according to the commands of a control algorithm 100, in the form of a computer readable code, which is described in greater detail below.

As stated above, the camera 10 powers up in the fixed focus mode and to elect auto focus, the photographer moves a toggle switch, such as the switch 31, from a neutral position to a position diagrammatically shown in FIG. 1 as AF thereby setting the processor 25 to the auto-focus mode. After selecting the auto-focus mode, the photographer depresses a shutter release button 34 half way to generate an electrical signal conveyed by a lead 36 to the processor 25 wherein the steps of an auto-focus control algorithm 200, also in the form of a computer readable code, are initiated for incremental control of the lens. The control algorithm 200 will be described hereinafter in greater detail.

Simultaneous with depression of the shutter release button 34, a liquid crystal display (LCD) 38 receives a signal via a lead 39 and lights up to indicate that the auto-focus mode has been selected.

During operation of the camera 10 in the auto-focus mode, the above described focusing process is initiated and maintained as the photographer holds the shutter release button 34 at the halfway position. As this accrues, incident light from an object to be photographed (not shown) enters through the lens 14 and passes through the shutter 14 where the light impinges on the CCD 15. In the CCD 15, an I/O transfer occurs and a signal is sent via a lead 18 to an analog to digital converter 21 (A/D converter) where the auto-focus control algorithm 200 controls the steps in implementation of the auto-focus mode.

Figure 7:
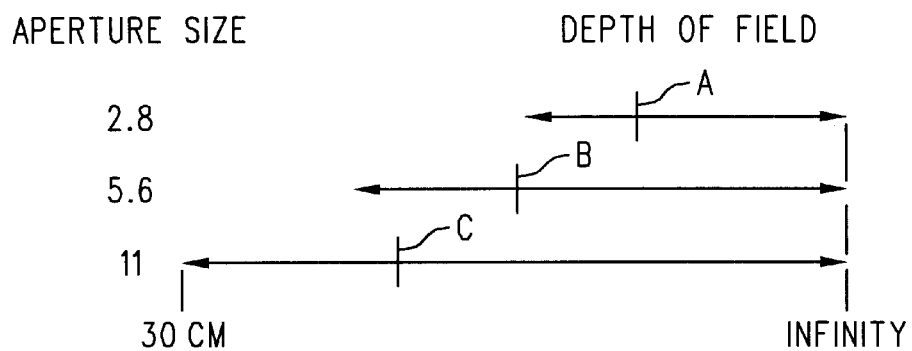
FIG. 7 is a diagrammatic representation of depth of field in relation to fixed focus camera aperture size.

Upon completion of the focusing process, the camera 10 has completed its analysis of frequency data and processor 25 controlled lens movement follows the curve shown in FIG. 7 until the focal point P has been detected. A display now appears on an LED (not shown) to let the photographer know that the shutter release button 34 can now be pushed all the way in so that the picture may be taken.

It should be noted that a novel aspect of the camera 10 auto focus mode is that, after the process of finding the focal point described above with reference to FIG. 7 has been completed, camera settings are maintained for subsequent pictures.

Figure 3:
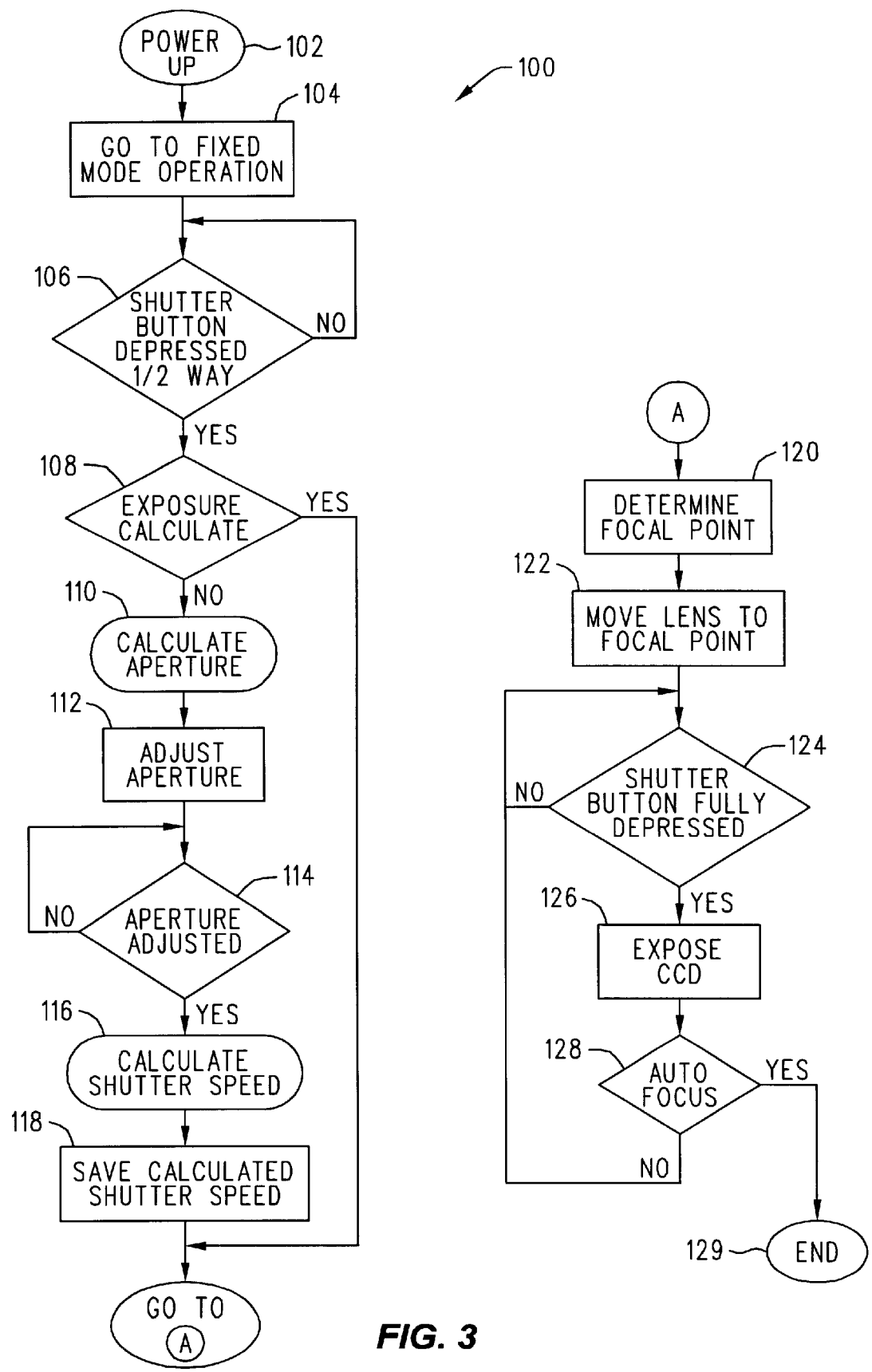
FIG. 3 is a control algorithm embodied within the digital camera of FIG. 1, showing the operational steps in a fixed focus lens adjustment process of the present invention.

Considering now the fixed focus mode of the digital camera 10 and the control algorithm 100 in greater detail, with reference to FIG. 3, the algorithm 100 begins when the camera 10 is powered up as indicated in a box 102. The algorithm then immediately proceeds to a command 104 which is followed by a command 106. At the command 106, a determination is made as to whether the shutter control button 34 is depressed half way. When the answer to the command 106 is YES the program then proceeds to a command instruction 108. If the answer to the command 106 is NO, the program loops back until the shutter button is depressed half way.

If the answer to the command instruction 108 is YES, the program proceeds to a command which is immediately followed by a command 122 whereby the lens 14 is moved to the focal point. If the answer to the command instruction 108 is NO, a sub routine command 110 occurs and it is immediately followed by a command instruction 112. The command 112 is then followed by a command 114 is made and, if the answer is NO, the program loops back to repeat the command instruction 112. If the answer is YES a command 116 is implemented and it is immediately followed by a command 118.

The command 118 is followed immediately by a command 120 which, in turn, is followed by a command 122. After the command 122 has been implemented, the program proceeds to a command instruction 124. If a determination is made that the shutter button 34 is fully depressed, a command 126 occurs. This is followed immediately by a command instruction 128 and, if the answer thereto is YES the program moves to a command 129 thereby ending the program. If at the command 124, and again at the command 128, the answers are NO, the program loops back to implement the command 124.

Figure 4:
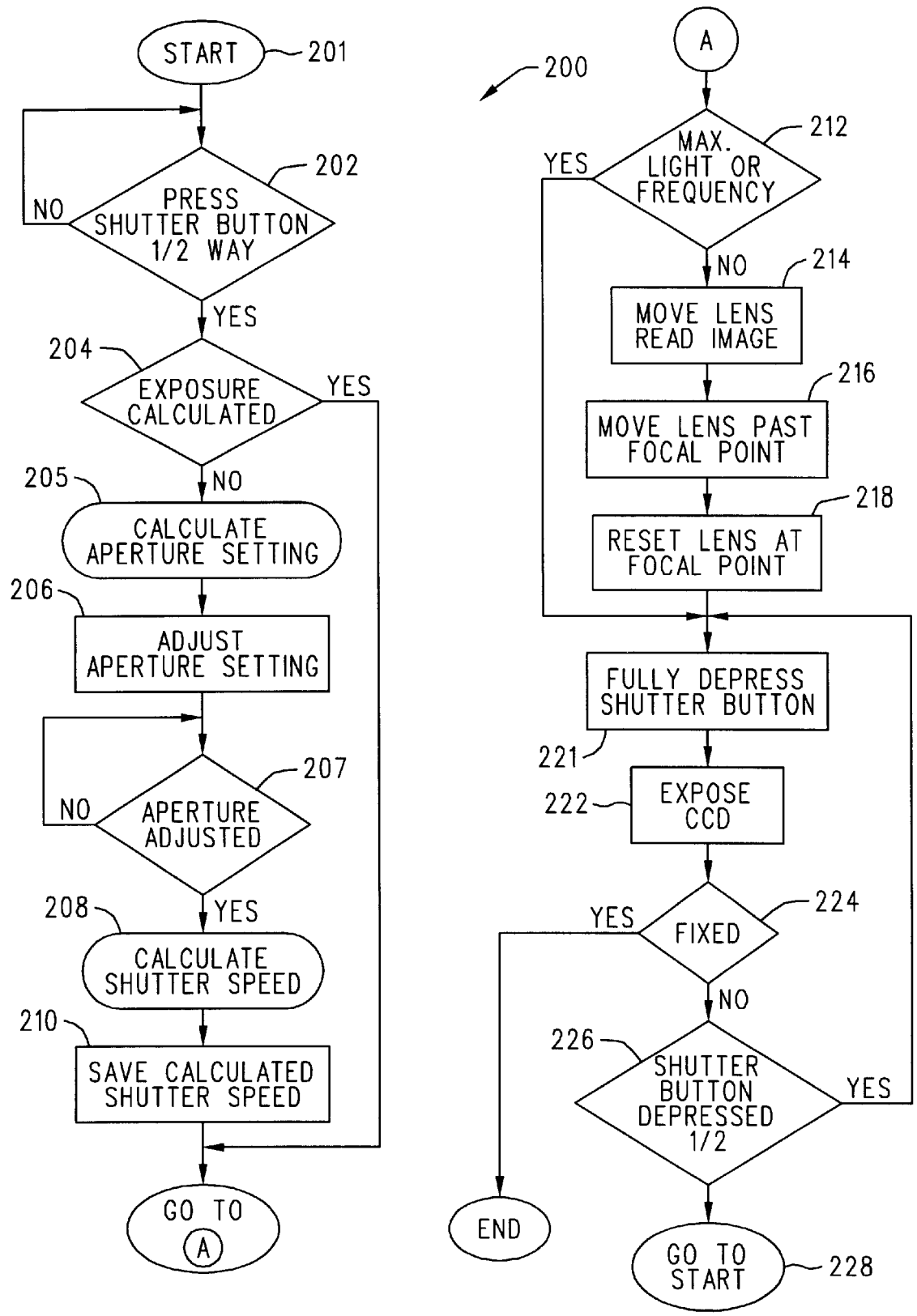
FIG. 4 is a control algorithm embodied within the digital camera of FIG. 2, showing the operational steps in the auto-focus lens adjustment process of the present invention.

Considering now the auto-focus mode of the digital camera 10 and the control algorithm 200 in greater detail, with reference to FIG. 4, the algorithm 200 begins when the camera 10 is powered up as indicated at a box 201 and a command instruction 202 immediately follows. If a determination is made that the shutter button 34 is not depressed half way, the program loops back and repeats the command 202. If, on the other hand, a determination is made that the button is so depressed, the program immediately moves to an instruction command 204 and, if the response to the inquiry therein made is YES, the program immediately moves to an instruction command 212.

If, on the other hand, the response to the command instruction 202 is NO, the program proceeds to a command 205, which is immediately followed by a command 206 for adjusting the aperture of the focusable lens 14. After the adjustment step, the program proceeds to a command instruction 207 and if the response thereto is NO, the program loops back to repeat the command 207. If, however, a determination is made that the aperture is adjusted the program proceeds to a command 208 wherein the shutter speed is calculated. This command is immediately followed by a command 210. At this stage of the program, the shutter speed has been saved and the program proceeds to the instruction command 212.

If the response to the instruction command 212 is YES, the program proceeds to a command 221. If, on the other hand, the response is NO, the instruction 212 is immediately followed by a command 214 and then, by a command 216. The command 216 is immediately followed by a command 218, following which, if an affirmative answer is given, the program immediately returns to the command 212.

When the photographer fully depresses the shutter button 34, in conformance with the command 221, the program immediately proceeds to a command 222. This in turn is followed by an instruction command 224 and, if the answer thereto is YES, the program ends. If, however, the response is NO, the program proceeds to a command instruction 226 and thence to a command 228. If in response to the command 224, the answer is NO, the program loops back to repeat the command 221 and following. This process is repeated until the shutter button 34 is fully depressed, at which point the program proceeds to the command 228 to return the program to the start command 201.

Figure 5:
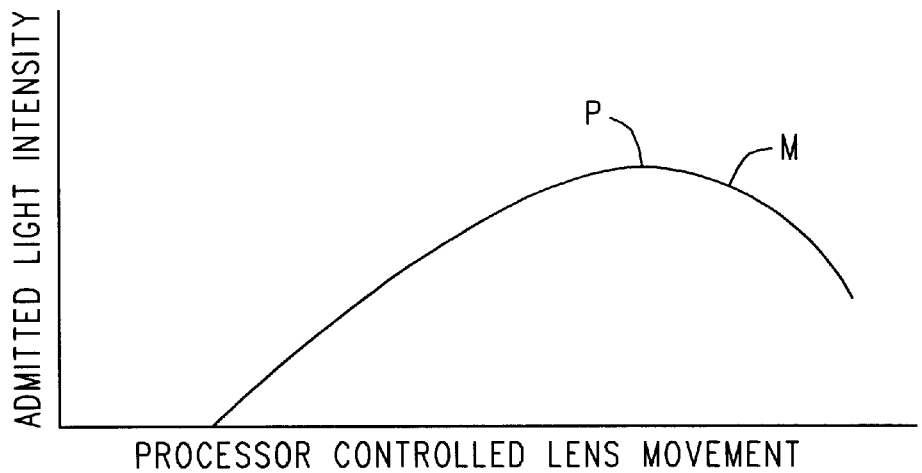
FIG. 5 is a graphic presentation wherein incident light intensity is plotted on the abscissa and processor controlled lens movement is plotted on the ordinate when the digital camera of the present invention is in auto-focus mode.

In further consideration of the auto focus mode of the camera 10, with reference now to FIG. 5, there is shown a graph plotting admitted light intensity on the ordinate and processor controlled lens movement on the abscissa to show camera 10 auto-focus operations. As the command steps of the control algorithm 200 are performed, in search of a focal point P, the lens 14 is moved incrementally, thereby producing a curve C, until a focal point P is achieved and the lens moves past the focal point P, according to the algorithm 200 command step 216. After lens movement past the focal point P, the data frequency received by the camera 10 begins to diminish and the curve changes direction. At a point M, it is recognized that the focusable lens 14 has moved too far and the program implements the I5 command step 218 to back up the lens to the focal point P. At this point, of course, the camera 10 is in focus and a photograph may be taken.

Figure 6:
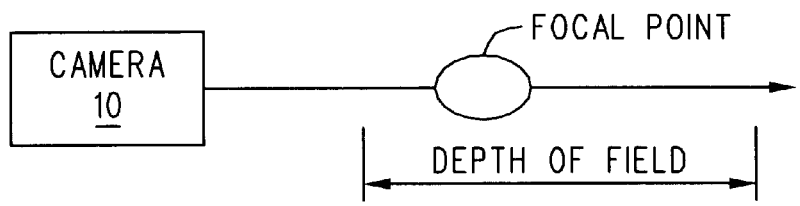
FIG. 6 is a diagrammatic representation of a focal point of a camera lens in relation to depth of field.

The camera 10 affords several novel features. For example, in the fixed focus mode, the camera can utilize a large depth of field to allow picture taking under most conditions. In this regard, in FIG. 6 there is shown a diagrammatic representation of a camera focal point in relation to depth of field. As known to those skilled in the art, the depth of field is an area in front of and behind the true focal point that is perceived to be in focus. It will be noted that an object to be photographed (not shown) can be located between the camera 10 and the focal point, or beyond the focal point.

In both the fixed-focus mode and the auto focus mode, depth of field increases as the size of the aperture decreases. As a result, instead of having a fixed focal point locator location, the present invention affords a different location depending on the aperture size. This is shown in FIG. 7, where the effect of aperture size on depth of field is illustrated. The right hand side of the arrows are fixed at infinity to allow the photographer to take pictures of a distant object. The tick marks A, B and C show the actual focal point or distance that the lens is fixed on and. It will be noted that the distance differs for each aperture setting.

The following table shows the depth of field attained by the fixed-focus camera of the present invention.

TABLE I

| APERTURE | MIN. FOCUS DISTANCE | MAX FOCUS DISTANCE |
| --- | --- | --- |
| 2.8 | 80 cm. | Infinity |
| 5.6 | 50 cm. | Infinity |
| 11 | 30 cm | Infinity |

In summary, in conventional digital cameras, the CCD controlled auto focus process can take between 1 and 3 seconds. Of course, when close in work is required and a sharp image is necessary, this time delay is acceptable. However, in a significant number of cases, fine tuning of the lens by the CCD is not necessary and the default fixed-focus mode of the present invention proves to be highly advantageous.

The present invention may be embodied in other specific forms without departing from its spirit or essential characteristics. The described embodiments are to be considered in all respects only as illustrative and not restrictive. In this regard, for example, while the described embodiment includes a mechanical shutter, the novel inventions set forth herein have application also to digital cameras which utilize electronic shutters. Thus the scope of the invention is indicated by the appended claims rather than by the foregoing description. All changes which come within the meaning and range of equivalency of the claims are to be embraced within their scope.

What is claimed is:

1. A digital camera including a housing and a lens having an adjustable aperture associated therewith for admitting light into said housing and onto an image sensing device for converting the light to an electrical signal, said camera comprising:
   a) a camera setting adjustment system responsive to the electrical signal indicative of the object to be photographed for automatically adjusting the aperture to an optimal setting relative to an ambient lighting condition surrounding the object to be photographed;
   b) a fixed focus mode algorithm for determining a focal point based on the adjusted aperture, for moving the lens to a focal point corresponding to said adjusted aperture, and for retaining the focal point corresponding to the adjusted aperture as a default setting; and
   c) an automatic focus mode algorithm responsive to the optimal setting of the adjustable aperture for moving the lens to a determined focal point upon receipt of an externally generated activation command of said automatic focus mode algorithm.

2. A digital camera as claimed in claim 1 wherein the fixed focus mode algorithm is operable upon receipt of an externally generated activation command.

3. A digital camera as claimed in claim 1 wherein initial powering thereof is directed to the fixed focus mode algorithm.

4. A method of operating a digital camera having a housing and a lens having an adjustable aperture associated therewith for admitting light into said housing and onto an image sensing device for converting the light to an electrical signal, said camera comprising:
   a) automatically adjusting the aperture to an optimal setting relative to an ambient lighting condition surrounding the object to be photographed;
   b) determining a fixed-focus focal point based on the adjusted aperture, moving the lens to a fixed-focus focal point corresponding to the adjusted aperture, and retaining the fixed-focus focal point corresponding to the adjusted aperture as a fixed-focus default setting; and
   c) determining an automatic-focus focal point based on the adjusted aperture and moving the lens to an automatic-focus focal point corresponding to the adjusted aperture.

* * * * *